C. Wells,
Cotton Press.

N° 60,301. Patented Dec. 4, 1866.

Witnesses. Inventor.

United States Patent Office.

IMPROVEMENT IN RACK MOTION FOR HAND PRESS.

CHARLES WELLS, OF CINCINNATI, OHIO.

Letters Patent No. 60,301, dated December 4, 1866.

SPECIFICATION.

TO ALL WHOM IT MAY CONCERN:

Be it known that I, CHARLES WELLS, of Cincinnati, in the county of Hamilton, and State of Ohio, have invented a new and useful Improvement in Rack Motion for Hand Press; and I do hereby declare that the following is a full, clear, and exact description thereof, which will enable others, skilled in the art to make and use the same, reference being had to the accompanying drawings, forming part of this specification, in which—

Similar letters of reference indicate like parts.

My invention has for its object to gain power at the ends of the rack where inertia and momentum are to be overcome in starting and stopping the rack; and it consists, first, in decreasing the speed of the rack relatively to the pinion shaft for a short distance at the ends of said rack, for the purpose of gaining force or power at those points; and second, in the combination of an eccentric pinion-wheel and curved sections of rack with the ordinary pinion-shaft, pinion-wheel, and rack, as hereinafter more fully described.

Figure 1:
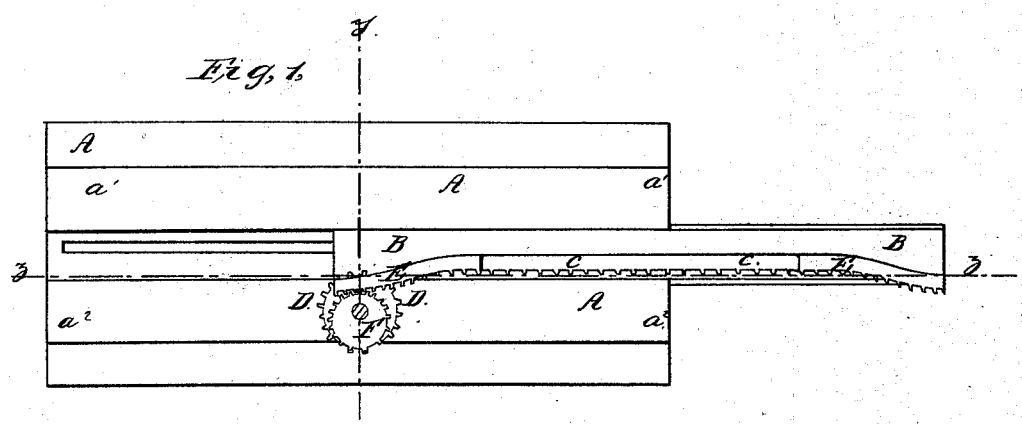
Figure 1 is a top view of a rack and pinion, with my improvement attached, partly in section, through the line $x\ x$, fig. 2.
Figure 2:
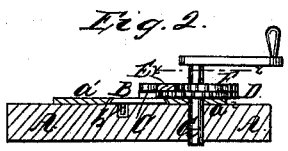
Figure 2 is a cross section of the same, taken through the line $y\ y$, fig. 1.
Figure 3:
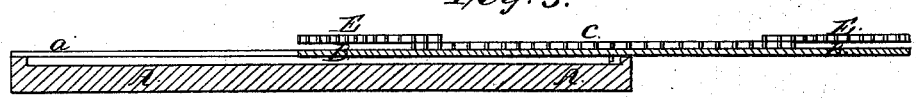
Figure 3 is a longitudinal section of the same, taken through the line $z\ z$, fig. 1.

A is the frame, or bed, in which the slide or bar, B, to which the rack, C, is attached slides. The side edges of the slide, or bar, B, are bevelled, as are also the edges of the plates, $a^1$ and $a^2$, which keep the said bar, B, in its place. And the bed or frame, A, is grooved or channeled, as shown in figs. 1, 2, and 3, in which channel works a stop pin, $b'$ attached to the central part of the under side of the bar, B. To the upper side of the bar, or slide, B, is securely attached the rack, C, into the teeth of which mesh the teeth of the pinion-wheel, D. To the upper sides of the ends of the rack, C, are securely attached the curved sections of rack, E, the first two or three teeth of each of which correspond with the teeth of the rack, C; but the other teeth are formed as shown in fig. 1. These sections, E, are also curved, as shown in fig. 1, so that their teeth may mesh into the teeth of the eccentric pinion-wheel, F, and they should be of a length equal to about one half the circumference of the said eccentric pinion-wheel. G is the pinion shaft, which revolves in bearings in the frame, A, and to which motion may be imparted in any of the ordinary ways. The pinion-wheel, D, is attached to the shaft, G, in such a position that its teeth may mesh into the teeth of the rack, C. To the pinion shaft, G, directly above the pinion-wheel, D, is attached the eccentric pinion-wheel, F, the longest radius of which is of the same length as the radii of the pinion-wheel, D. And at this point two or three of the teeth of the eccentric wheel, F, correspond with the teeth of the wheel, D, as shown in fig. 1; but the other teeth of the wheel, F, are made in the form shown in the drawings, so as to mesh into the teeth of the curved rack sections, E. By this construction, at those points where the greatest power is required in stopping and starting the machine to change the motion, this increased power is obtained by bringing the ends of the rack closer to the shaft, G, by the eccentricity of the wheel, F, and the curvature of the rack sections, E, as shown in fig. 1.

I am aware that an eccentric pinion has heretofore been employed in conjunction with a rack to operate a slide for decreasing the speed at certain points as in my invention; such an arrangement I do not claim, as it is clearly shown in the patent of HENRY BARNES, dated November 30th, 1858. My invention differs essentially from that of BARNES, above referred to, as he uses but one pinion, an eccentric one, to give motion to the slide, whilst I use two of different sizes in conjunction with a rack curved at its ends, my smaller eccentric pinion acting only at the curved ends of the rack, to decrease speed, and increase the power, whilst the larger of my pinions acts only on the straight portion of the rack.

Having thus fully described my invention, what I claim as new, and desire to secure by Letters Patent, is—

The rack C, having curved ends E E, in combination with the eccentric pinion F, and ordinary pinion D, of larger diameter, the whole being constructed arranged, and operated in the manner and for the purpose set forth.

CHAS. WELLS.

Witnesses:
 JOS. H. WOODRUFF,
 GEO. H. RAYMOND.